United States Patent Office 3,223,483
Patented Dec. 14, 1965

3,223,483
METHOD OF PRODUCING ACTIVE ALUMINA
Harry E. Osment, Baton Rouge, La., assignor to Kaiser Aluminum & Chemical Corporation, Oakland, Calif., a corporation of Delaware
No Drawing. Filed June 14, 1962, Ser. No. 202,387
11 Claims. (Cl. 23—143)

This invention relates to a method of making alumina material having a low content of sodium (as $Na_2O$). The invention can also be used to produce powder, agglomerates, nodules, or granules of active alumina possessing a "low soda" content which are particularly suitable for use as adsorbents and catalyst support materials.

Active alumina may be manufactured in shaped nodules or pellets, etc. in the form of spheres or the like. Preferably the shaped particles are uniform in size. Agglomerate or nodular forms of active alumina are particularly desirable because they can be more easily handled than particulate material and because they are particularly suited for use in beds or columns or the like through which liquids or gases may be passed.

For many catalysts and catalyst support applications, the alumina, including active alumina, must be of high purity. Metal ion contamination of greater than a few hundredths of a percent may seriously affect catalytic activity and catalyst life. Alumina, particularly alumina produced by the Bayer process which involves precipitation of aluminum hydrate from sodium aluminate solutions, frequently contains small amounts of sodium compounds usually referred to and calculated as soda ($Na_2O$). In the Bayer process the precipitated alumina hydrate may contain values of soda even after extensive washing of the precipitate. This soda content may amount to from 0.5 to 0.7% by weight of the alumina values.

The present invention provides a method of obtaining granules of alumina material, both active alumina and alumina with high loss on ignition, having a low sodium content by treating partially cured agglomerates of alumina with water of high purity without the use of reagents and additional costly processing. Previous methods concerning the preparation of low-soda alumina power or shaped forms have involved more costly feed materials and/or purification of the alumina prior to the formation of the shaped agglomerate. In the present invention the extra processing steps of pretreatment (reagent treatment, filtration, drying, etc.) are avoided, and soda extraction is effected simultaneously with one of the normal processing steps (curing) thereby yielding a low-soda agglomerate or shaped particle ready for activation and/or drying. In addition, in the case of active alumina products the method of the invention enables removal of sodium without reducing the adsorptive capacity or strength of the final product.

According to the invention, alumina trihydrate which is obtained from the Bayer process is selectively calcined to obtain a transitional alumina capable of at least partial rehydration. The selectively calcined alumina is agglomerated into granules or nodules by mixing with small amounts of water. The resulting granules are partially cured, i.e., partially rehydrated, and the partially cured granules are treated with a stream of rapidly circulating hot water of high purity to remove soluble sodium compounds from the alumina. After soda removal, the nodules may be dried and/or activated. Activation is accomplished by heating to again produce a transition alumina. The term "transition alumina" refers to intermediate decomposition products, between stable hydrated crystalline forms and completely anhydrous corundum, resulting from selective calcination of various hydrated aluminas, e.g., gibbsite, bayerite, boehmite, etc.

Alternatively, the low-soda nodules may be simply dried to a loss on ignition of the magnitude desired instead of being activated. Also, either product may be ground after drying and/or activating, to form a feed for an extrusion forming process.

The selectively calcined alumina as described above is nodulized by mixing with water. Water is added to the alumina usually in amounts of 50% per weight of the alumina. Water may be added by spraying in the nodulizing apparatus which may comprise a rotating drum through which the alumina is passed. If desired, however, the alumina can be nodulized by premixing with water prior to rotating or tumbling. The sizes of the nodules will depend upon the agglomerating conditions such as residence time in the rotating tumbler, speed of rotation, rate of feed, etc.

The formed nodules in general may be cured by any convenient procedure. The curing operation involves a rehydration of the transitional form of alumina in the nodules to a more fully developed crystalline form. The curing is normally accomplished by aging, that is, by allowing nodules of transitional alumina to rehydrate.

According to the invention, however, initial curing of the nodules of transitional alumina is not allowed to go to completion. The initial curing is conducted only to the extent necessary to develop sufficient physical strength to withstand necessary handling for soda removal. Prior to total rehydration of the transitional alumina nodules, the nodules are treated to remove soluble sodium compounds, e.g., sodium oxide ($Na_2O$) so as to reduce the soda content to a level which will render the active alumina form capable of satisfactory utilization as a catalyst support or a catalyst in applications where the sodium content of the catalyst must be very low. The sodium removal technique preferred is to provide a bed of partially cured nodules of active alumina in a container such as an elongated column and circulate hot water of high purity through the column into contact with the partially cured nodules. Such high purity water used for washing may be, for example, distilled or deionized water low in soda. The purity of the water and the alumina nodule size influences the rate of soda leaching. The soda may be removed from the circulating water by deionizing resins or it may be purged out of the circulating system continuously while leaching with fresh, pure, distilled or deionized (low soda) water, which is continuously added.

The process according to the invention comprises selectively calcining an alumina trihydrate such as is obtainable from Bayer plant processing to produce a transitional alumina capable of at least partial rehydration. The preferred method of selectively calcining involves passing alumina trihydrate through a high temperature zone very rapidly. Such a high temperature zone may be produced by a gas flame of sufficiently high temperature into which the alumina trihydrate can be injected. The actual temperature of calcination may be varied, depending upon the contact time of the alumina in the high temperature zone. The product of the calcination is a partially calcined alumina having a loss on ignition of 5 to 10%. The expression "loss on ignition" refers to the standard loss of weight obtained by heating the material to 1000° C. or more for a period of about one hour. The partially calcined alumina may be ground to a suitable particle size distribution, if desired, prior to subsequent treatment or nodulizing.

After selective calcining and, if desired, grinding, the alumina is granulated or otherwise formed into globules of desired configuration. The granulating, or agglomeration, e.g., nodulizing, can be accomplished by mixing the alumina with a small amount of water preferably in a tumbling mill under conditions to produce agglomerates of desired configuration and size. The agglomerates are partially cured, i.e., partially rehydrated and then are loaded into a column or in a bed through which the water, preferably at elevated temperature, may be circulated for the soda removal as described. The thus formed granules are then partially cured by maintaining selectively calcined alumina in contact with water for a period of time sufficient to partially rehydrate the alumina after curing. During rehydration, molecules of water combine with alumina molecules. The sodium content of the alumina is reduced by circulating water of high purity through the nodules which, preferably, are provided in a tower or column, at an elevated temperature, preferably between 80° and 98° C. to leach out the soda therefrom. The rehydration of the partially cured nodules is continued during the soda removal treatment. The nodules containing low quantities of soda are removed from the column, dried and/or activated by heating.

At this point the low soda nodules can be treated in several ways to produce a particular desired low soda alumina product. If an alumina product having a high loss on ignition is desired, the low soda nodules may be dried, e.g., at about 105° C., to a desired loss on ignition. If a powdered material is preferred, the dried nodules may be then ground. Moreover, the powdered material may thereafter be subjected to additional processing, e.g., pelletizing, extruding, etc., to produce various products or forms. The low soda alumina material is preferably dried prior to grinding.

In the event an active alumina product is preferred, the low soda nodule can be activated under appropriate conditions to product, as a final product, a transition alumina capable of rehydration. In this procedure the low soda nodules from the leaching column can be dried to remove a substantial portion of the uncombined water and to put the nodules in condition for activation by heating. The drying may be conveniently accomplished in the activator preliminary to activating. The active alumina product may be nodular or can be ground to powder. Active alumina material made according to the invention possesses a low soda content in addition to a loss on ignition of about 5 to 10%.

The nodules may be activated by passing a stream of hot air or combustion gases through a bed of cured agglomerates for a period of time to obtain a transition alumina of large surface area. The activating conditions can be varied within considerable limits. One satisfactory activating procedure involves heating the agglomerate for approximately one hour to a temperature in the range of 750° to 800° F.

It has been found that by following this procedure of soda leaching, at least about 90%, and usually better than 95%, of the soda ($Na_2O$) can be removed. For example, alumina material having an initial soda content of greater than 0.5% has consistently been reduced to below 0.03 weight percent soda by the method of the invention. As indicated above, the water, after washing the nodules, may be treated to remove the soda therefrom, e.g., by circulating through a bed of cationic deionizing resins. This allows the water to be reused for the soda leaching and thereby minimizes water consumption. In addition this results in minimum heat requirements, since the effluent soda-laden water may be deionized at high temperature (80–98° C.) and, with very little additional reheating, may be recirculated to the leaching column. Alternatively, however, water may be purged out of the circulating system while introducing fresh, hot water of suitably high purity. The nodule washing or soda leaching procedure is adaptable to continuous counter-current operation.

The balance of the curing or rehydration of the alumina nodules is accomplished simultaneously with the washing or leaching step and in this way the product of the soda leaching procedure consists of nodules of totally rehydrated alumina having the desirable low soda concentration. The nodules may be dried and/or activated by heating to produce a transition alumina of large surface area. The product of this process has a low soda content without sacrifice of strength or other physical properties desirable in active alumina for use as adsorbents or catalyst supports.

As further examples of the inventive method, five tests were performed using the procedure of the invention to reduce the soda level from an initial content of 0.52% ($Na_2O$) to an average of 0.023% ($Na_2O$) with particles of 6 x 8 mesh size (U.S. sieve). This represents a removal of 95.5% of the soda present. Soda values as low as 0.015% have been achieved by this process. Water temperatures varied between 88° and 95° C. with mass flow rates of water through the bed of nodules of 120 pounds per square foot per minute. The column of alumina nodules was leached for 20 to 24-hour periods; a circulating system volume of 25 liters of water was maintained with a purge rate of 300 ml. per minute. It is noted, however, that the water consumption may be eliminated by employing deionizing resins for continuously removing soda from the water which may then be reused to leach the alumina.

It is apparent that the various changes and modifications may be made without departing from the spirit of the invention. Accordingly, the scope of the invention should not be limited except by the appended claims.

What is claimed is:

1. In the method of producing alumina material by selectively calcining alumina trihydrate to obtain a transition alumina capable of at least partial rehydration, agglomerating the selectively calcined alumina by mixing with water, rehydrating the alumina agglomerates and then heating said rehydrated agglomerates, the improvement for producing a material of low sodium content which comprises the following procedure for said rehydration:
   (a) only partially rehydrating the alumina agglomerates;
   (b) circulating water of low sodium content through the partially rehydrated alumina agglomerates to remove soluble sodium compounds therefrom and lower the sodium content thereof while continuing the rehydration of the partially rehydrated alumina agglomerates.

2. The method according to claim 1 wherein the circulating water is deionized water.

3. The method according to claim 1 wherein the circulating water is distilled water.

4. The method according to claim 1 wherein the circulating water is at a temperature of at least 60° F.

5. In the method of producing powdered alumina material by selectively calcining alumina trihydrate to obtain a transition alumina capable of at least partial rehydration, agglomerating the selectively calcined alumina by mixing with water, rehydrating the alumina agglomerates, heating to dry said rehydrated agglomerates and grinding the agglomerates, the improvement for producing a material of low sodium content which comprises the following procedure for said rehydration:
   (a) only partially rehydrating the alumina agglomerates;
   (b) circulating water of low sodium content through the partially rehydrated alumina agglomerates to remove soluble sodium compounds therefrom and lower the sodium content thereof while continuing the rehydration of the partially rehydrated alumina agglomerates.

6. In the method of producing active alumina agglomerates by selectively calcining alumina trihydrate to obtain a transition alumina capable of at least partial rehydration, agglomerating the selectively calcined alumina by mixing with water, rehydrating the alumina agglomerates and then activating the alumina agglomerates by heating to produce a transition alumina of large surface area, the improvement for producing a material of low sodium content which comprises the following procedure for said rehydration:

(a) only partially rehydrating the alumina agglomerates;
(b) circulating water of low sodium content through the partially rehydrated alumina agglomerates to remove soluble sodium compounds therefrom and lower the sodium content thereof while continuing the rehydration of the partially rehydrated alumina agglomerates.

7. The method according to claim 6 wherein the circulating water is deionized water.

8. The method according to claim 6 wherein the circulating water is distilled water.

9. The method according to claim 6 wherein the circulating water is at a temperature of at least 60° F.

10. The method according to claim 6 wherein the agglomerates are exposed to the circulating water until the concentration of sodium as $Na_2O$ in the nodules is below about 0.03% by weight.

11. In the method of producing active alumina agglomerates by selectively calcining alumina trihydrate to obtain a transition alumina capable of at least partial rehydration, granulating the selectively calcined alumina by mixing with water, rehydrating the alumina granules and activating the alumina granules by heating to produce a transition alumina of large surface area, the improvement which comprises:

(a) only partially rehydrating the alumina granules;
(b) disposing the partially rehydrated granules in a column;
(c) circulating water of low sodium content through the column of partially rehydrated alumina granules to remove soluble sodium compounds therefrom and lower the sodium content thereof while continuing the rehydration of the partially rehydrated alumina granules before activating the alumina granules by heating to produce a transition alumina of large surface area whereby active alumina agglomerates having a low sodium content are produced.

References Cited by the Examiner
UNITED STATES PATENTS

| | | | |
|---|---|---|---|
| 2,372,233 | 3/1945 | Thurston | 23—50 |
| 2,378,155 | 6/1945 | Newsome | 23—143 |
| 2,405,275 | 8/1946 | Stowe | 23—141 |
| 2,478,675 | 8/1949 | Tamele et al. | 23—141 |
| 2,499,675 | 3/1950 | Owen | 23—142 XR |
| 2,876,068 | 3/1959 | Tertian | 23—142 |
| 2,881,051 | 4/1959 | Pingard | 23—143 |

OTHER REFERENCES

Newsome et al., "Alumina Properties," Technical Paper No. 10 (2nd Revision), Aluminum Co. of America, Pittsburgh, Pa., 1960, 88 pages (pages 33–45 and 49–51 of particular interest).

Tertian et al. (A), "Academie des Sciences, Comptes Rendus," volume 236, 1953, pages 1565–1567.

Tertian et al. (B), "Journal de Chimie Physique," volume 55, May 1958, pages 341–353.

BENJAMIN HENKIN, *Primary Examiner.*

MAURICE A. BRINDISI, *Examiner.*